US012741209B2

(12) United States Patent
Murphy et al.

(10) Patent No.: US 12,741,209 B2
(45) Date of Patent: Sep. 22, 2026

(54) SELECTING AN INTERPRETATION OF INPUT ACTUATION INFORMATION RECEIVED FROM A CONTROLLER

(71) Applicant: Sony Interactive Entertainment Inc., Tokyo (JP)

(72) Inventors: Alan Murphy, London (GB); Mark Friend, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 458 days.

(21) Appl. No.: 18/353,280

(22) Filed: Jul. 17, 2023

(65) Prior Publication Data

US 2024/0024769 A1 Jan. 25, 2024

(30) Foreign Application Priority Data

Jul. 21, 2022 (GB) ..................................... 2210671

(51) Int. Cl.
*A63F 13/428* (2014.01)
*A63F 13/211* (2014.01)

(52) U.S. Cl.
CPC .......... *A63F 13/428* (2014.09); *A63F 13/211* (2014.09)

(58) Field of Classification Search
CPC ...... A63F 13/428; A63F 13/211; A63F 13/22; A63F 13/24; A63F 13/214; A63F 13/28
See application file for complete search history.

(56) References Cited

U.S. PATENT DOCUMENTS

| | | | | |
|---|---|---|---|---|
| 9,804,696 | B2 | 10/2017 | Hall | |
| 10,639,543 | B2 * | 5/2020 | Campbell | A63F 13/218 |
| 2001/0045938 | A1 | 11/2001 | Willner | |
| 2004/0263696 | A1 * | 12/2004 | Rogers | H04B 1/202 341/176 |

(Continued)

FOREIGN PATENT DOCUMENTS

| | | | |
|---|---|---|---|
| JP | 2007075426 | A | 3/2007 |
| WO | 2009134004 | A1 | 11/2009 |
| WO | 2016109464 | A1 | 7/2016 |

OTHER PUBLICATIONS

Combined Search and Examination Report for corresponding GB Application No. 2210671.0, 7 pages, dated Jan. 23, 2023.

(Continued)

*Primary Examiner* — Peter J Iannuzzi
(74) *Attorney, Agent, or Firm* — Fish & Richardson P.C.

(57) ABSTRACT

Disclosed are an entertainment device, a method and a computer program. The entertainment device includes receiver circuitry and processing circuitry. The receiver circuitry receives, from a controller, input actuation information and associated motion detection information, where the input actuation information is indicative of detected actuation of at least one manual actuation input of the controller and the associated motion detection information is indicative of detected motion of the controller. The processing circuitry processes a game state of a game and, in at least a first mode of operation, selects, from amongst a plurality of interpretations, an interpretation of the input actuation information in dependence on the associated motion detection information and updates the processing of the game state in dependence on the selected interpretation of the input actuation information.

20 Claims, 11 Drawing Sheets

(56) References Cited

U.S. PATENT DOCUMENTS

2007/0236460 A1 10/2007 Young
2012/0214587 A1* 8/2012 Segal .................... A63F 13/814 463/30
2014/0082514 A1 3/2014 Sivaraman
2016/0107081 A1* 4/2016 Hirai ....................... A63F 13/95 463/31
2018/0046271 A1 2/2018 Hall
2019/0126141 A1* 5/2019 Monastyrskyy .... G06F 3/03543

OTHER PUBLICATIONS

Extended European Search Report for corresponding EP Application No. 23184696.5, 9 pages, dated Dec. 11, 2023.
Combined Search and Examination Report issued in corresponding GB Application No. 2210671.0 on Sep. 27, 2024; 3 pages.
Anonymous, "First Retail Simputer Runs Embedded Linux," Apr. 7, 2024, retrieved on Feb. 4, 2026, retrieved from URL<https://linuxdevices.org/first-retail-simputer-runs-embedded-linux/>, 4 pages.

* cited by examiner

FIG. 2

SELECTING AN INTERPRETATION OF INPUT ACTUATION INFORMATION RECEIVED FROM A CONTROLLER

BACKGROUND OF THE INVENTION

Field of the Invention

The present technique relates to the field of entertainment devices and more particularly to interpretation of input actuation information received from a controller.

Description of the Prior Art

Even with the recent advances in performance capture (i.e., tracking of a system user's motion to induce a corresponding effect on a displayed graphic), a handheld controller remains the most popular input device for the electronic game industry.

FIGS. 1 and 2 illustrate the DualSense® controller 80 as an example of a handheld controller. Such a controller typically has two handle sections 81L,R and a central body 81C. Various controls (also referred to as manual actuation inputs) are distributed over the controller, typically in local groups. Each control can be manually actuated by a user in order to control, for example, a game state of a game. Examples include a left button group 82L, which may comprise directional controls (directional control buttons), and one or more shoulder buttons 90L, and similarly right button group 82R, which comprises function controls, and one or more shoulder buttons 90R. The controller (typically in the central portion of the device) may also comprise one or more system buttons 86, which typically cause interaction with an operating system of the entertainment device rather than with a game or other application currently running on it; such buttons may summon a system menu, or allow for recording or sharing of displayed content. Furthermore, the controller may comprise one or more other elements such as a touchpad 88, a light for optical tracking (not shown), a screen (not shown), haptic feedback elements (not shown), and the like. The controller also includes left and/or right joysticks 84L,R, which may optionally also be operable as buttons by pressing down on them. On the back of the controller (as shown in B and C of FIG. 2) are provided trigger buttons 92L,R.

The handheld controller 80 may also comprise, inside the controller's body, motion detection circuitry (e.g. accelerometer and/or gyroscope circuitry) to detect motion of the controller.

In typical use, a handheld controller such as the DualSense® controller 80 is typically held by a user in two hands, as shown in FIG. 3. In particular, FIG. 3 shows a handheld controller 80 being held by a user's left hand 100L gripping the left handle section 81L and the user's right hand 100R gripping the right handle section 81R. In this configuration, the user can operate any of the controls on the left-hand side 102L of the controller with digits on their left hand (for example, the user may use their left thumb to operate the left joystick 84L and the left button group 82L, and their left index finger to operate the left shoulder button 90L and the left trigger 92L). Conversely, the user can operate any of the controls on the right-hand side 102L of the controller with digits on their right hand (for example, the user may use their right thumb to operate the right joystick 84L and the right button group 82L, and their right index finger to operate the right shoulder button 90L and the right trigger 92L).

However, this arrangement can be problematic for users who are unable to operate the handheld controller 80 with both hands simultaneously, since it can be difficult to reach all of the controls on the controller 80 when holding the controller in one hand or when one of two hands is not fully functional. For example, some users may have mobility issues which affect one hand more than the other, or may only have one hand.

The present invention seeks to mitigate or alleviate this problem.

SUMMARY OF THE INVENTION

In a first example of the present technique, there is provided an entertainment device as defined in claim 1.

In another example of the present technique, there is provided a method as defined in claim 13.

In another example of the present technique, there is provided a computer program as defined in claim 14.

In another example of the present technique, there is provided a computer-readable storage medium as defined in claim 15. The computer-readable storage medium can be transitory or non-transitory.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1 and 2 show an example of a handheld controller

DESCRIPTION OF THE EMBODIMENTS

Figure 1:
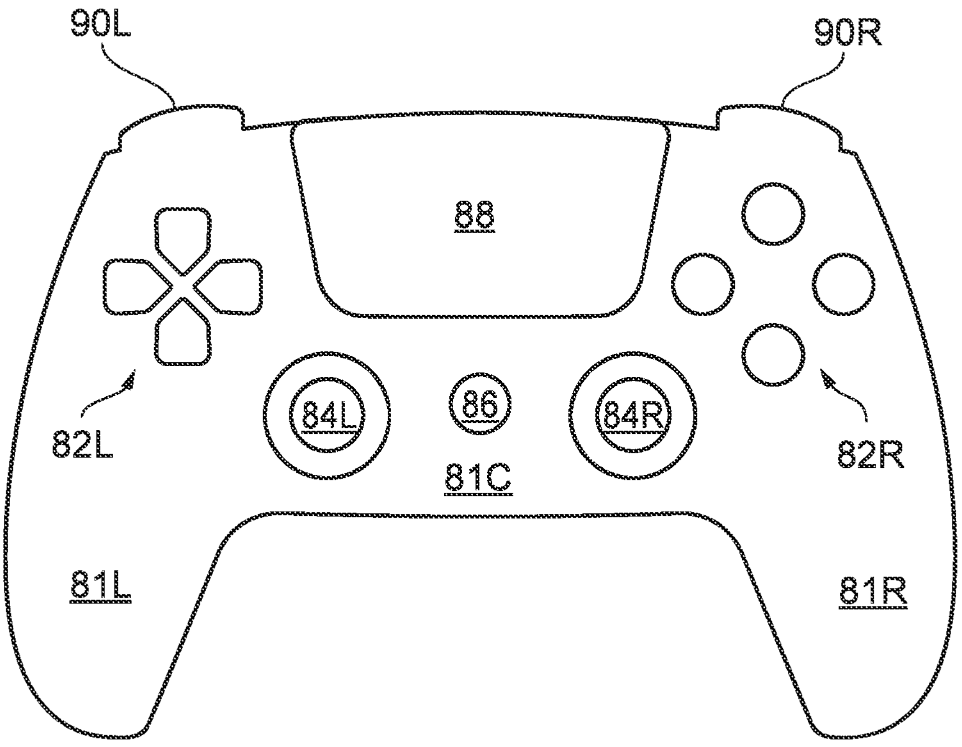
Figure 3:
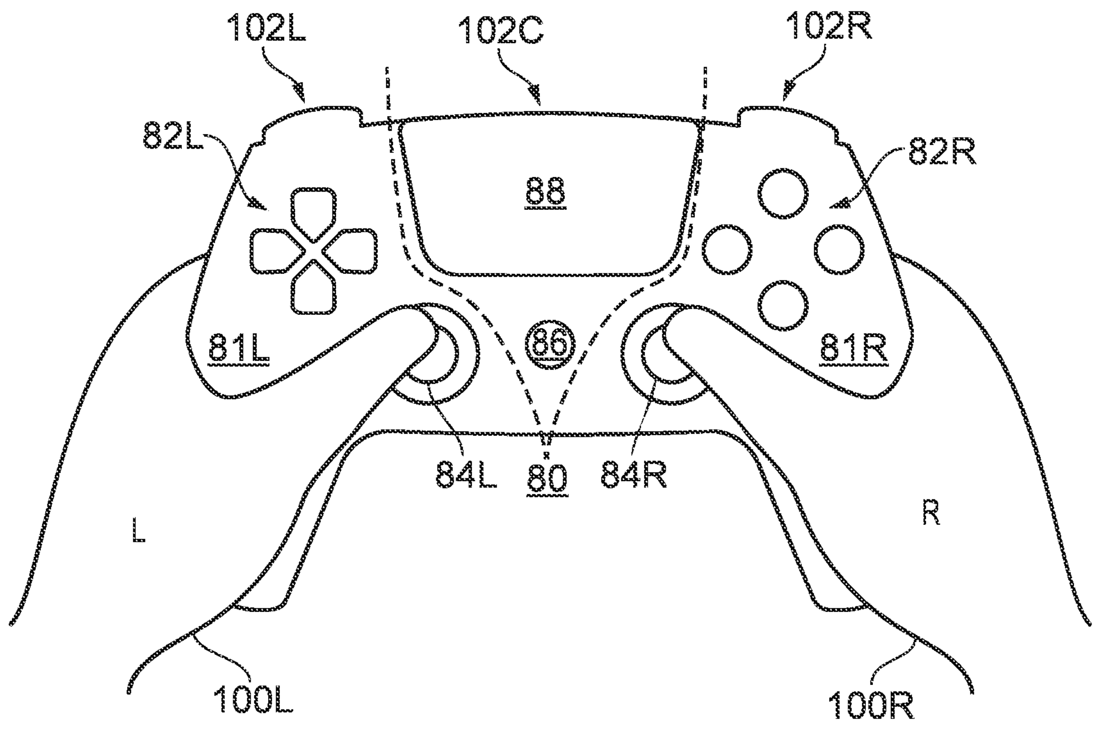
FIG. 3 shows an example of how a handheld controller can be operated using two hands.

For clarity of illustration, elements illustrated in the figures have not necessarily been drawn to scale. Further, where considered appropriate, reference numerals have been repeated among the figures to indicate corresponding or analogous elements.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

Methods and systems are disclosed for controlling an interpretation of input actuation information received from a controller. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 4:
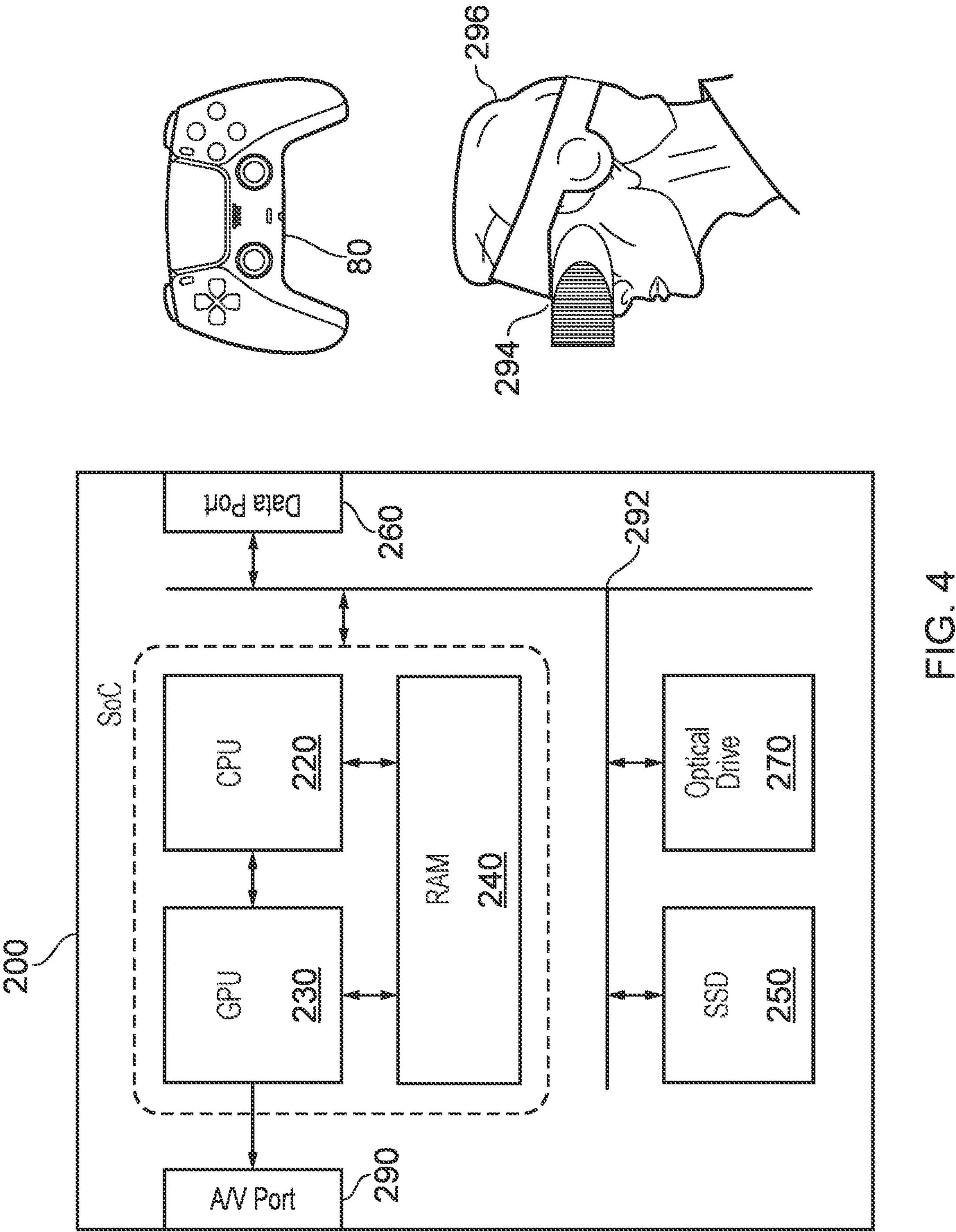
FIG. 4 is an example of an entertainment system.

Referring now to the drawings, wherein like reference numerals designate identical or corresponding parts throughout the several views, FIG. 4 shows an example of an entertainment system comprising an entertainment device 200, at least one handheld controller 80 and, optionally, a head mounted display 294. In this example, the entertainment device 200 comprises a computer or console such as the Sony® PlayStation 5® (PS5).

The entertainment device 200 comprises a central processor 220. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5. The central processor 220 is an example of processing circuitry to process a game state of a game and, in at least a first mode of operation, select, from amongst a plurality of interpretations, an interpretation of control actuation information in dependence on the associated motion detection information, and update the processing of the game state in dependence on the selected interpretation of the control actuation information.

The entertainment device also comprises RAM 240, and may either have separate RAM for each of the CPU and GPU, or shared RAM as in the PS5. The or each RAM can be physically separate, or integrated as part of an SoC as in the PS5. Further storage is provided by a disk 250, either as an external or internal hard drive, or as an external solid state drive, or an internal solid state drive as in the PS5.

The entertainment device may transmit or receive data (e.g. including input actuation information and motion detection information transmitted by the one or more handheld controllers 80) via one or more data ports 260 (e.g. receiver circuitry), such as a USB port, Ethernet® port, WiFi® port, Bluetooth® port or similar, as appropriate. It may also optionally receive data via an optical drive 270. The data ports 260 and the optical drive 270 are examples of receiver circuitry to receive, from a controller, control actuation information and associated motion detection information, wherein the control actuation information is indicative of detected actuation of at least one control of the controller and the associated motion detection information is indicative of detected motion of the controller.

Figure 2:
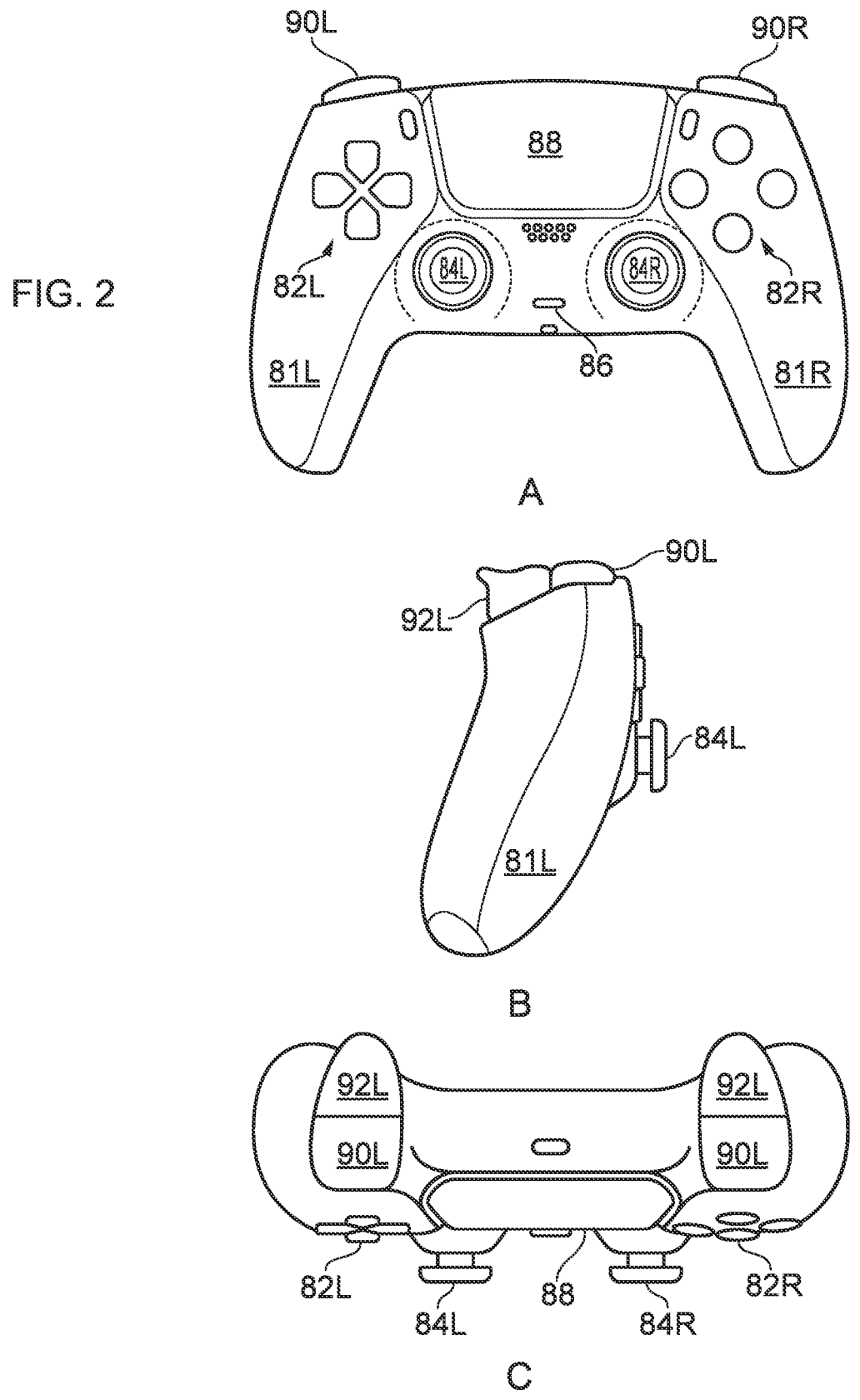

Interaction with the system is typically provided using one or more handheld controllers 80, such as the DualSense® controller in the case of the PS5 (as illustrated in FIGS. 1 and 2).

Audio/visual outputs from the entertainment device are typically provided through one or more A/V ports 290, or through one or more of the wired or wireless data ports 260. An example of a device for displaying images output by the entertainment system is a head mounted display 'HMD' 294, worn by a user 296.

Where components are not integrated, they may be connected as appropriate either by a dedicated data link or via a bus 292.

Figure 5:
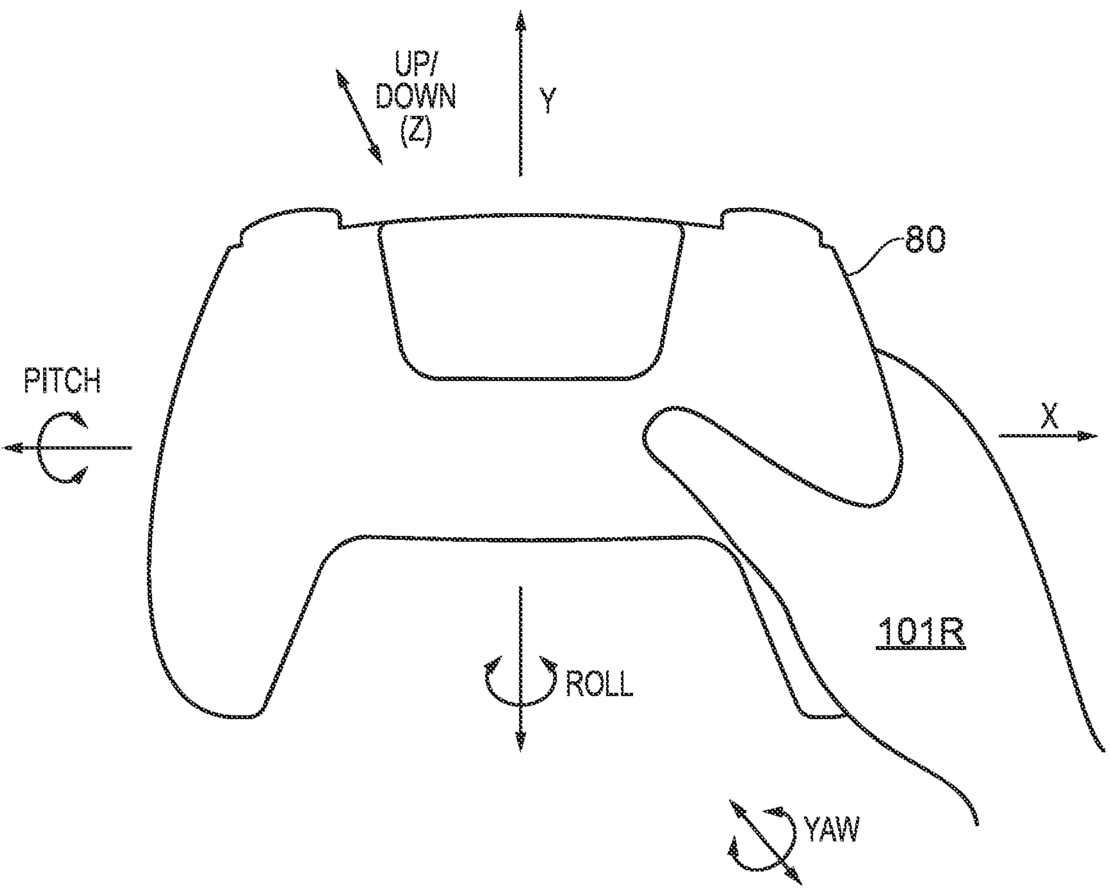
FIG. 5 is an example of how a handheld controller can be operated using one hand.

FIG. 5 shows an example of how a handheld controller may be controlled using one hand, according to the present technique. In particular, FIG. 5 shows an example of a handheld controller 80 being held by a user, by the right handle section 81R, in the user's right hand 101R. As explained above, a user gripping the right handle section 81R in their right hand may be able to reach any of the controls on the right-hand-side 102R of the controller (these controls being an example of a second group of controls arranged for actuation by a right hand of a user) or in the central region 102C of the controller 80; however, the user may not be able to reach the controls on the left-hand side 102L of the controller 80 (these controls being an example of a second group of controls arranged for actuation by a left hand of a user).

In examples of the present technique, detected motion of the controller is used, by the entertainment device, to interpret the user's actuation (e.g. operation) of the controls. This allows the user to actuate controls which are within their reach (e.g. the controls in the right and central regions, in the example of FIG. 5) and for this to be interpreted as actuation of controls that are not within the user's reach.

In a particular example, the user may apply a particular pattern of motion to the controller to indicate that detected actuation of one of the controls on the right-hand side of the controller should be interpreted as if a corresponding one of the controls on the left-hand side was actuated. This interpretation is an example of a control-remap interpretation in which actuation of the at least one control is interpreted as actuation of at least one different control. The user may then apply a different pattern of motion (or may hold the controller still) to indicate that detected actuation of one of the controls on the right-hand side of the controller should be interpreted as normal (e.g. interpreting actuation of the controls on the right-hand side as actuation of those same inputs).

The controller 80 may be configured to detect motion along or around any of three axes—translational motion along the "X", "Y" and "Z" axes (left and right; forward and back; up and down) and rotational motion around these same axes (e.g. rotation about the X-axis ("pitch"), rotation about the Y-axis ("roll") and rotation about the Z-axis ("yaw")). The patterns of motion applied by the user may, therefore, involve motion along or about any of these axes either singly or in combination. Motion about or around any of the X, Y and Z-axes is an example of the detected motion comprising at least one of a change in orientation (e.g. rotation about one of the axes) of the controller and a change in position (e.g. movement along one of the axes) of the controller.

In a particular example, the user may rotate the controller 80 about the pitch axis to indicate that actuation of any of the controls on the right-hand side should be interpreted as if a corresponding control on the left-hand side was actuated. The corresponding control may be any input on the left-hand side. For example, if the right joystick 84R, right bumper 90R or right trigger 92R is actuated while the controller is rotated about the X-axis, this may be interpreted as actuation of the left joystick 84L, left bumper 90L or left trigger 92L respectively. Similarly, actuation of any of the buttons in the right button group 82R could be interpreted as actuation of a corresponding button in the left button group 82L. For example, the corresponding button could be a button in the same position in the left-button group relative to the position of the button in the right-hand group 82R (e.g. the right-most button in the right button group may be interpreted as the right-most button in the left button group); this is an example of a transpose interpretation, in which a position of the control relative in the second group of controls substantially aligns with a position of the control in the first group of controls. In another example, the corresponding button could be a button in a reflected position in the left-button group (e.g. the right-most button in the right button group may be interpreted as the left-most button in the left button group); this is an example of a mirror interpretation, in which a position of the control in the second group of controls substantially aligns with a minor image of a position of the control in the first group of controls. Note that, in some examples, the entertainment device may be arranged to support both the mirror interpretation and the transpose interpretation, with each interpretation being selectable in dependence on the motion detection information.

It will be appreciated that the exact pattern of motion to be applied by the user is not particularly limited, and the user may even be able to set some control value in a menu displayed by the entertainment system to determine which pattern or patterns of motion trigger which interpretation(s). Moreover, it will be appreciated that although FIG. 5 shows an example of holding the handheld controller 80 in a user's right hand, the invention can equally be applied when a user holds the controller in their left hand, or when a user holds the controller 80 in both hands but is unable to actuate some of the controls for some other reason (e.g. mobility issues).

Figure 6:
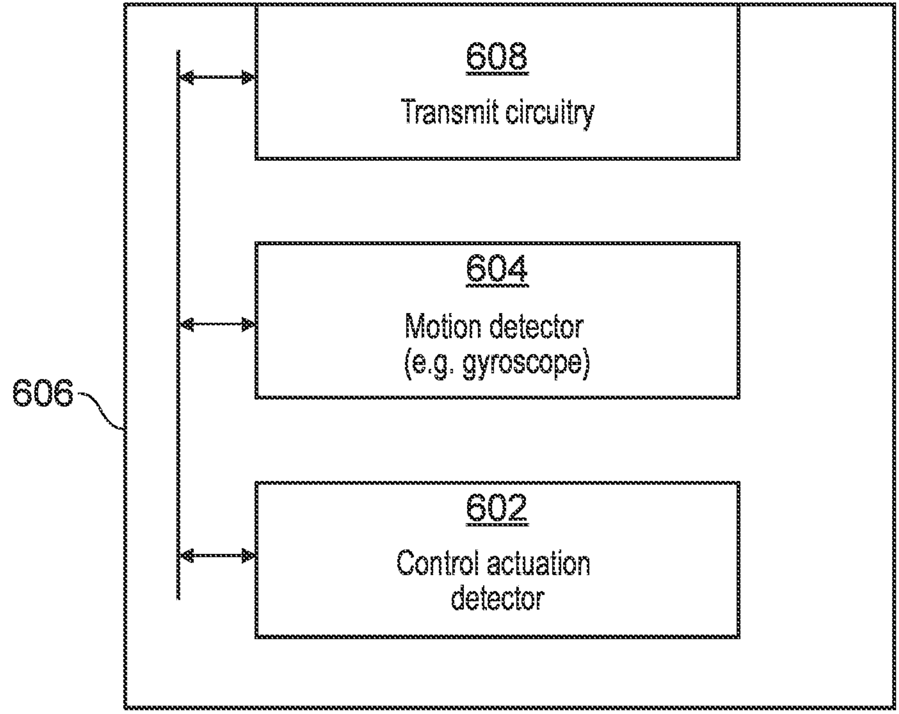
FIG. 6 is an example of circuitry within a handheld controller.

FIG. 6 shows an example of some of the circuitry within a handheld controller 80. The circuitry includes control actuation detector circuitry 602 to detect actuation of any of the controls on the controller 80 and a motion detector 604 (which could be a gyroscope) to detect motion of the controller 80. The control actuation detector circuitry 602 and the motion detector circuitry 604 are each coupled to an interface 606, which is also coupled to transmit circuitry 608. The transmit circuitry 608 is arranged to transmit, to an entertainment device, motion detection information generated by the motion detection circuitry 604 and control actuation circuitry generated by the control actuation detector circuitry 602. The transmit circuitry 608 may include one or more data ports 260, such as a USB port, Ethernet® port, WiFi® port, Bluetooth® port or similar, as appropriate, and/or may include an optical drive.

FIGS. 7 to 11 show examples of methods which may be performed in accordance with the present technique. Each of these methods may be performed by a computer, which could for example be a general purpose computer or the entertainment device of FIG. 4. The methods may be performed by the computer under the control of a computer program executed by the controller—for example, a computer program (which could be stored on a computer-readable storage medium, such as either a transitory or a non-transitory computer-readable storage medium) may comprise instructions which, when executed on a computer, cause the computer to perform any of the methods in FIGS. 7 to 11. Note that any of the methods in FIGS. 7 to 11 may be performed in combination.

Figure 7:
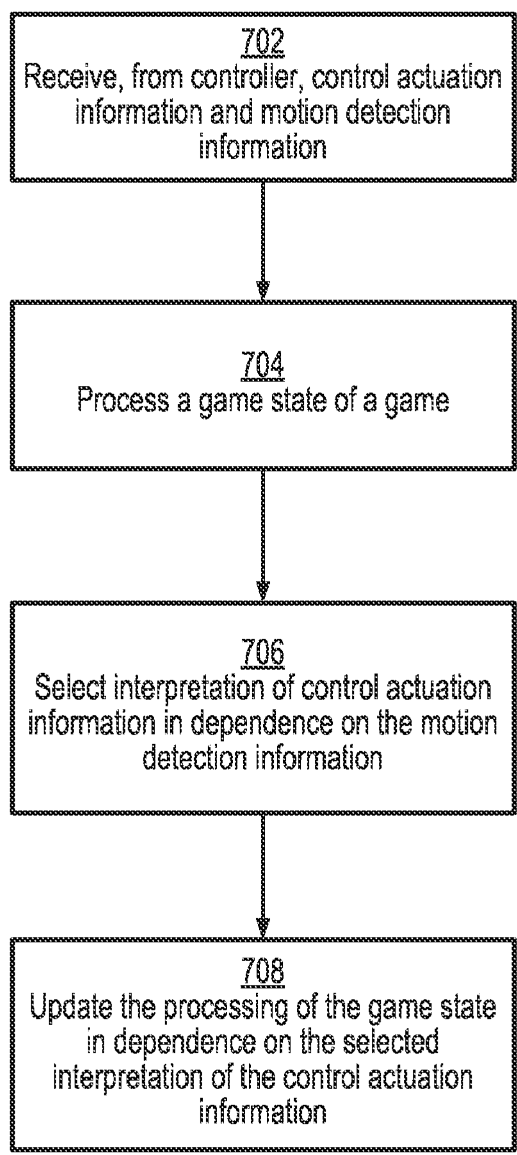
FIGS. 7 to 11 are flow diagrams showing example methods of interpreting input actuation information received from a controller.

FIG. 7 shows a method of updating processing of a game state in a first mode of operation, in dependence on a selected interpretation of control actuation information received from a controller. The method comprises receiving 702, from a controller (e.g. from the handheld controller 80 discussed above), control actuation information and associated motion detection information. The control actuation information is indicative of detected actuation of one or more controls of the controller and the associated motion detection information is indicative of detected motion of the controller. The associated motion detection information may be associated with the control actuation information by, for example, being received within a predetermined time of reception of the control actuation information.

The method also comprises processing 704 a game state of a game and selecting 706, from amongst a plurality of interpretations, in dependence on the motion detection information, a selected interpretation of the control actuation information. Once an interpretation has been selected, the processing of the game state is updated 708 in dependence on the selected interpretation.

Hence, by applying the method of FIG. 7, the interpretation of control actuation information can be adjusted based on motion detection information received from the controller; this allows a smaller number of controls to be used to control the game state of the game, improving the accessibility of the system to a user.

Figure 8:
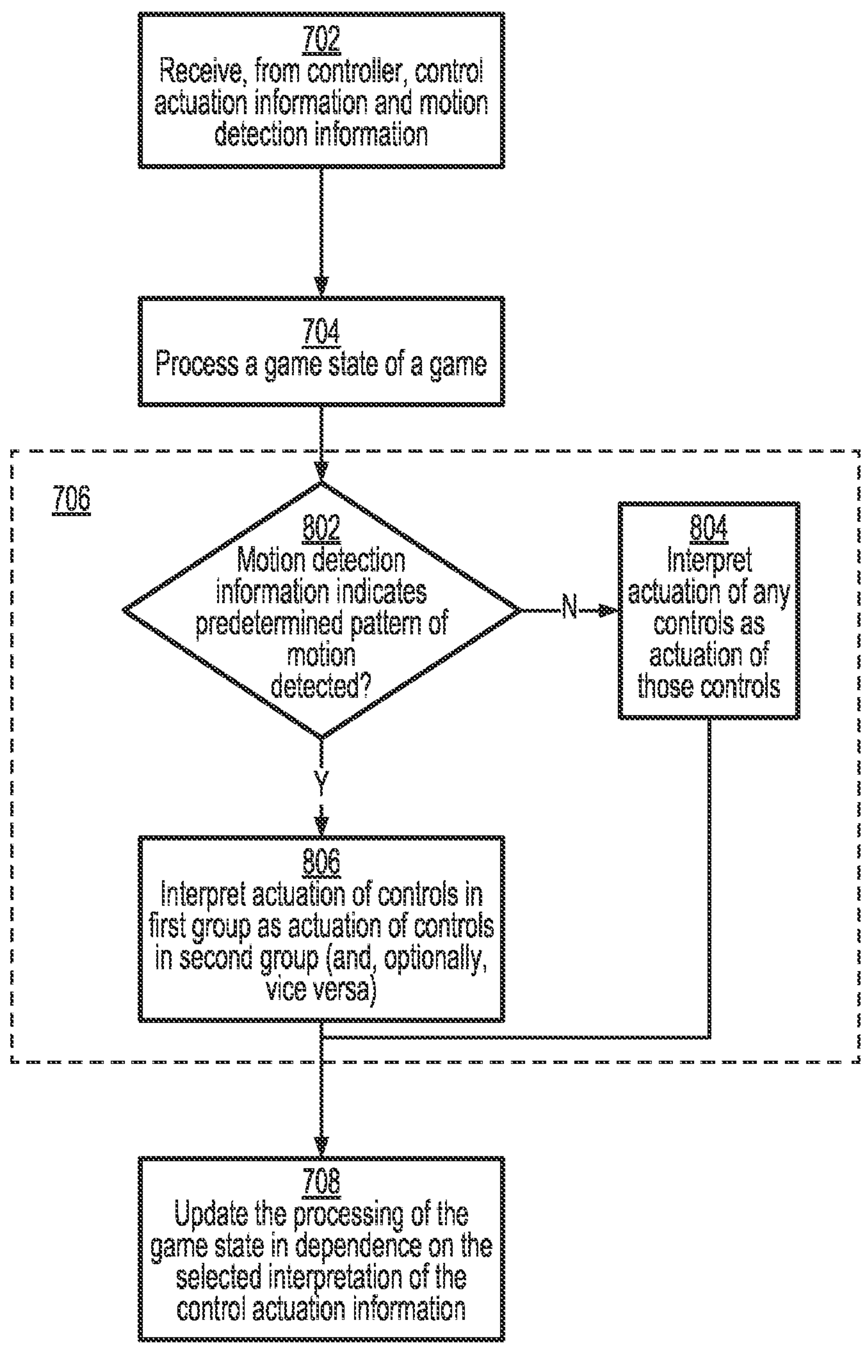

FIG. 8 shows a particular example of the method in FIG. 7. In particular, FIG. 8 shows an example where the step 706 of selecting an interpretation of the control actuation information comprises determining 802 whether the motion detection information received from the controller indicates that a predetermined pattern of motion of the controller has been detected. For example, although not shown in the figure, this could optionally involve comparing the detected motion of the controller to at least one predetermined threshold criterion. In absence (N) of the predetermined pattern of motion being detected (e.g. if the at least one predetermined threshold criterion is not met), the method comprises 804 interpreting the actuation of any of the manual actuation inputs of the controller as normal (e.g. as actuation of those same manual actuation inputs—for example, actuation of button "X" is interpreted as actuation of button X). For example, this could be considered to be inhibit selection of the selected interpretation of the control actuation information unless it is determined that the detected motion satisfies the at least one predetermined threshold criterion.

On the other hand, if the predetermined pattern of motion is detected (Y), the method comprises interpreting 806 actuation of any controls in a first group of controls (e.g. this could include all controls on the left/right-hand side of the controller, or all controls in one of the button groups on the controller) as actuation of controls in a second group of controls (comprising different controls than the first group of controls)—for example, actuation of any button "Y" in a first group of buttons may be interpreted as if different button "Z" in a second group of buttons was actuated.

This approach allows actuation of any controls in a given group of controls to be mapped, when a given pattern of motion is detected, onto a different group of controls. This improves accessibility by allowing a user to control the game state to be updated based on functions associated with the second group of controls, even when these controls are not within the user's reach.

Figure 9:
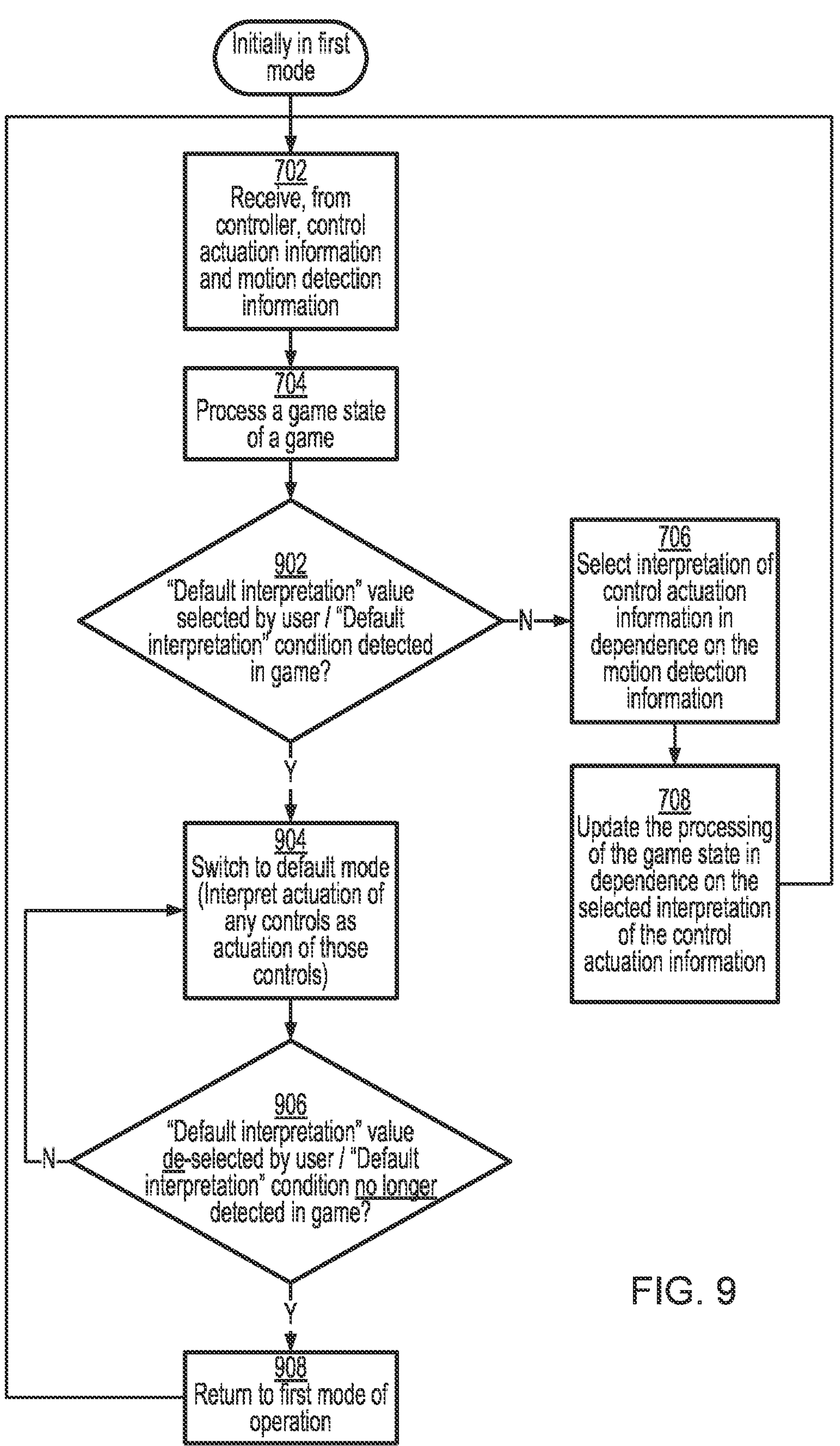

FIG. 9 shows an example of a method in which the interpretation of input actuation elements based on motion detection information can be selectively toggled on and off. In this example, the method proceeds as in FIG. 7 (referred to as operating in a first mode of operation) unless it is determined 902 that a given user-selected value (e.g. a "Default interpretation" value) has been selected by a user and/or a predetermined condition (e.g. a "Default interpretation" condition such as a given in-game event) has been detected in-game (note that, in the present technique, it is possible but not essential for both of these triggers to be supported). In this case (Y), the method involves switching 904 to a "default" mode of operation, in which actuation of any given control is interpreted as actuation of that control itself and not as actuation of another input. The default mode of operation is, therefore, an example of a second mode of operation, in which processing circuitry of an entertainment device or computer is configured to update the processing of the game state in dependence on a default interpretation of the control actuation information, independent of the associated motion detection information.

The method then involves continuing to operate in the default mode until it is determined 906 that the predetermined value has been de-selected and/or the in-game condition no longer exists, at which point the method comprises returning 908 to the first mode of operation.

Figure 10:
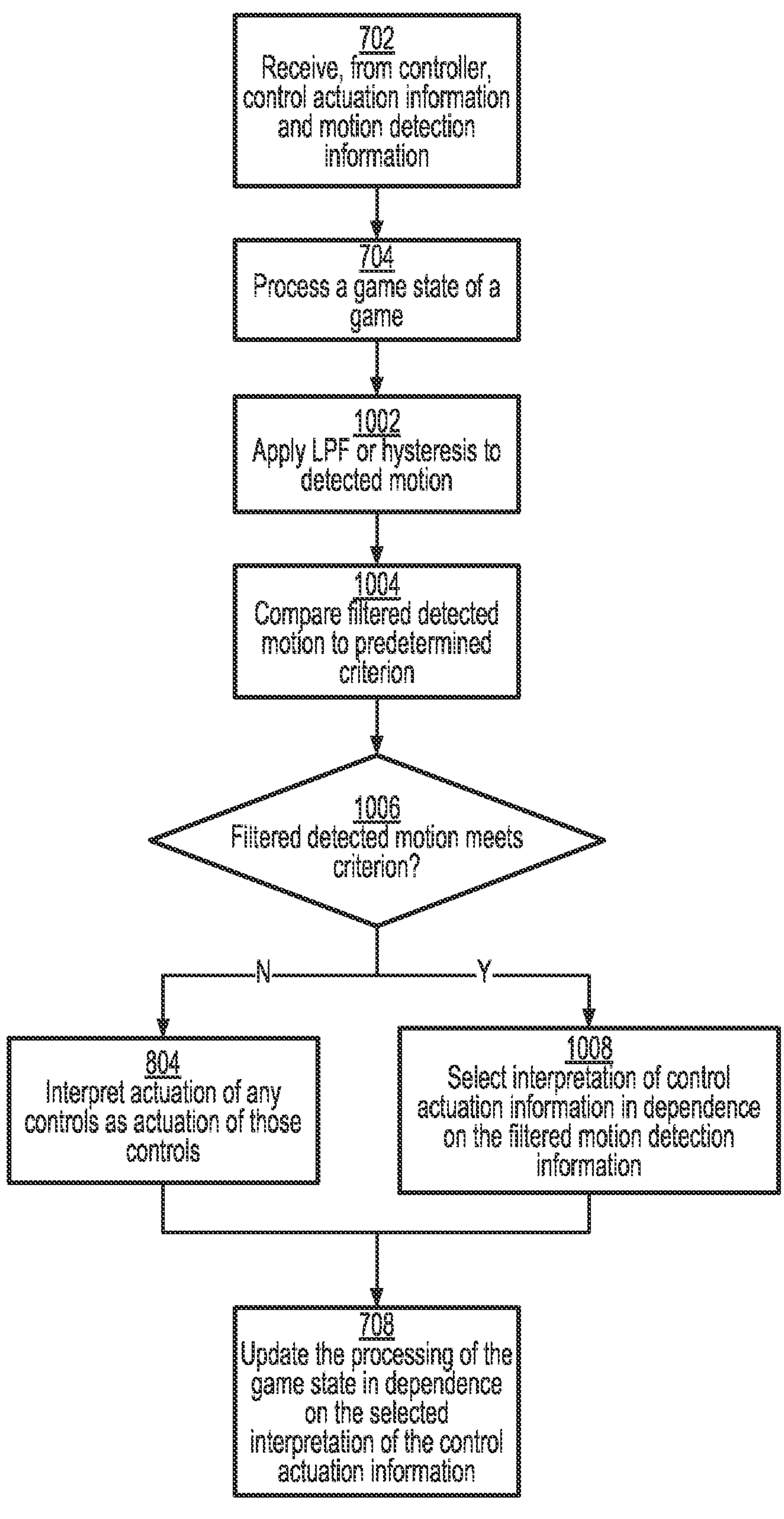

FIG. 10 is an example of a method in which a low-pass filter (LPF) or hysteresis is applied to the motion detection information. This could be particularly beneficial for supporting use of the controller by users with hand tremors, for example.

In the method of FIG. 10, a low-pass filter or hysteresis is applied 1002 to the detected motion indicated by the motion detection information, in order to determine a filtered detected motion. The filtered detected motion is then compared 1004 to a predetermined criterion, and it is determined 1006 whether that criterion has been met. The predetermined criterion can be any criterion—for example, it could be a threshold amount of rotation of the controller (e.g. a threshold number of degrees) or a threshold distance to be covered by the controller. Moreover, the filtered detected motion may be compared to multiple predetermined criteria, with each criterion indicating that a different interpretation should be applied to the input actuation information—in this case, it may be determined, at step 1006, whether at least one of these criteria has been met.

When it is determined that the (at least one) predetermined criterion has been met (Y), an interpretation of the input actuation information is then selected based on the filtered detected motion. On the other hand, when it is determined that the (at least one) predetermined criterion has not been met (N), the method comprises 804 interpreting the actuation of any of the manual actuation inputs of the controller as normal (e.g. as actuation of those same manual actuation inputs).

Once an interpretation has been selected 804 1008, the processing of the game state is updated 708.

Hysteresis may also be applied at a threshold used as the trigger point for selecting how a group of controls is interpreted; for example, the threshold may be when the controller is held at an angle □ relative to the horizontal, so that when held more horizontally (below □), inputs are interpreted as normal, but when held more vertically (above □), inputs in the first group are interpreted as being from the second group as described elsewhere herein. In this case, there may be a hysteresis of, for example, 5 degrees so that when transitioning through angle □, the new interpretation is maintained even if the controller transitions back through angle □ by up to the hysteresis angle of 5 degrees (and vice-versa). A benefit of this may be for example that the user can set the angle □ to be comfortable to use, potentially with a relatively small motion required to transition, but the hysteresis can allow the small motion to trigger the transition without needing to be too precise, or necessarily maintain the position for long. It will be appreciated that this approach may apply to changes in position as well as rotation.

Figure 11:
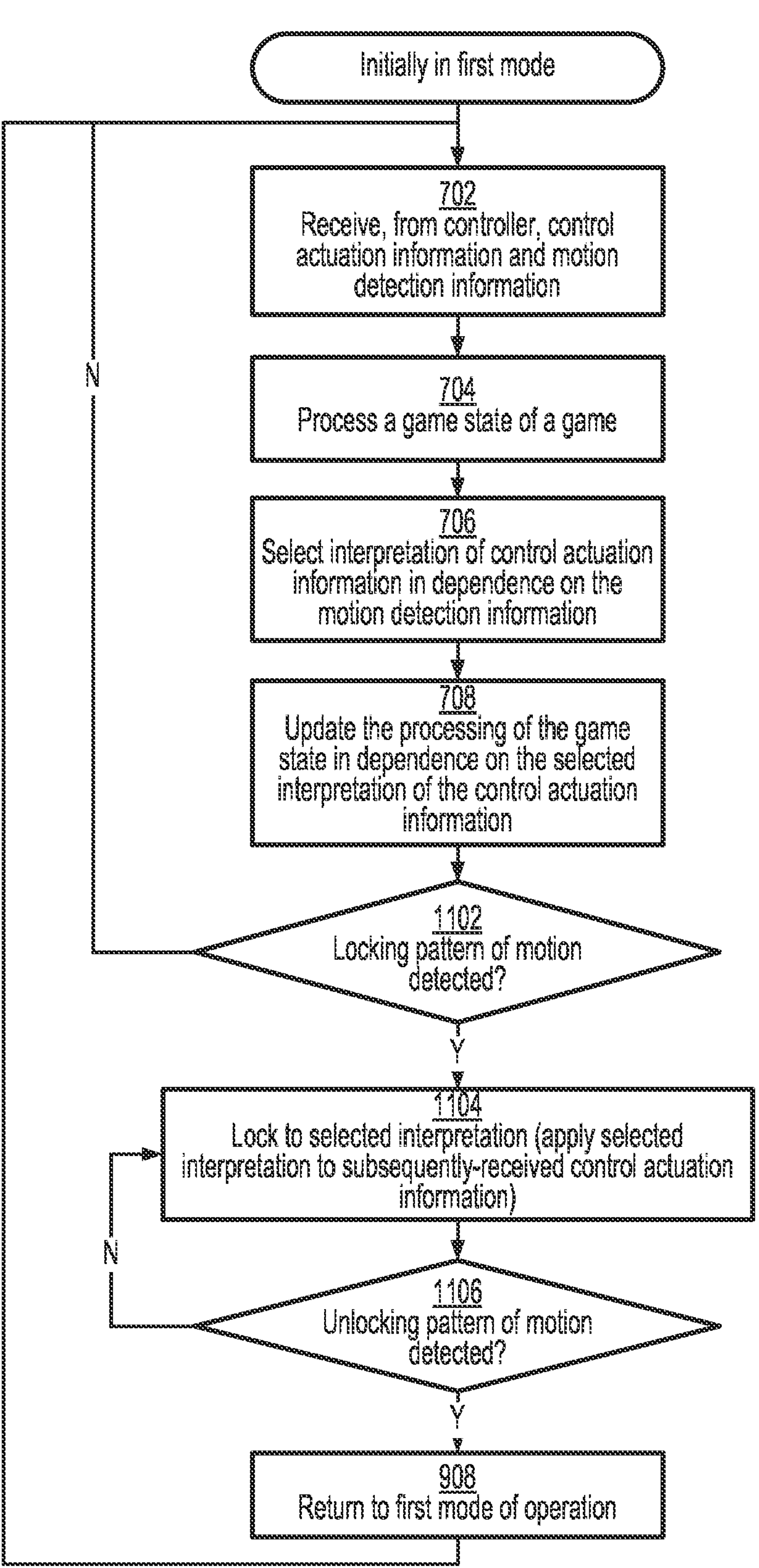

FIG. 11 shows an example method in which the interpretation to be applied to the control actuation information can be locked to a particular (locked) interpretation. In this method, it is determined 1102, based on the associated motion detection information, whether a locking pattern of motion has been detected. For example, the locking pattern of motion could be a predetermined pattern of motion (e.g. a pattern of motion that triggers a particular interpretation of the control actuation information) that is performed twice within a predetermined time period. However, it will be appreciated that any other pattern of motion could be used as the locking pattern of motion.

When (Y) the locking pattern of motion is detected, the method comprises locking 1104 the interpretation of any further control actuation information received from the controller to a previously-selected interpretation. The previously-selected interpretation is an example of a locked interpretation, comprising an interpretation selected in dependence on previous motion detection information received before entering the locked mode of operation.

For example, where the locking pattern of motion is a predetermined pattern of motion that is performed twice, the previously-selected interpretation could be whichever interpretation corresponds with the predetermined pattern of motion, and this could be applied to subsequently-received control actuation information independent of any motion detection information received with the subsequently-received control actuation information.

Steps 1102 and 1104 are an example of processing circuitry of the entertainment device or computer being responsive to the associated motion detection information indicating that a locking pattern of motion of the controller has been detected to begin operating in a locked mode of operation; and in response to further control actuation information received by the receiver circuitry while in the locked mode of operation, updating the processing of the game state in dependence on a locked interpretation of the further control actuation information, independent of further motion detection information received in association with the further control actuation information.

The selected interpretation then remains locked until it is determined 1106 that an unlocking pattern of motion has been detected. Once this unlocking pattern of motion has been detected (Y), the method comprises returning 908 to the first (e.g. unlocked) mode of operation.

The entertainment device and methods of the present technique enable use of a handheld controller by a user who is unable to access all of the controls on the controller, by allowing them to—for example—actuate a control that they can reach while applying a pattern of motion that indicates, to the entertainment device, that the actuation of that control should be interpreted as if a different control was actuated.

To give a particular example, purely for illustrative purposes, a user who is only able to use their right hand to hold the controller may turn the controller upside down (e.g. by rotating the controller approximately 180° about one of the X, Y and Z axes) to indicate that actuation of, for example, the right-joystick should be interpreted as if it were actually the left-joystick being actuated. This allows the function associated with the left joystick—which the user may not be able to reach—to be useable by the user. For example, in some games the left joystick controls motion of an in-game avatar while the right joystick controls a camera angle (e.g. allowing the user to look around the avatar's environment). In this example arrangement, the user could hold the controller face-up when operating the right joystick to look around, and hold the controller face-down when operating the right joystick to move.

It will, of course, be appreciated that this is just one specific example of how the present technique may be implemented. Any other interpretation of any of the controls of the controller could be applied in addition or instead of that discussed above, and the pattern of movement can be any pattern of movement.

It will be appreciated that the methods and techniques herein refer to detected motion and to patterns of movement; whilst this may relate for example to moving the controller in a circle as a pattern of movement, or turning it upside down, or moving it horizontally to the right by at least 20 cm as a detected motion, more generally the detected motion indicates a change in physical position and/or orientation of the controller that transitions through some triggering criterion; for example changing an angle in one or more axes beyond a threshold angle, changing position along one or more axes beyond a threshold displacement, or describing a path (such as a circle) to a threshold extent and/or with a threshold accuracy.

It will be appreciated that methods and techniques described herein may be carried out on conventional hardware (such as entertainment device 200) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, ROM, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

For example, the methods and techniques described herein may be implemented by an operating system (or helper app thereof) of the entertainment device, which presents the interpreted inputs to a game or other application so that this game or other application can operate transparently and without specific adaptation of its own. Optionally however a specific game or application itself may implement the methods and techniques described herein in the event that these are not supported at the system level.

A particular benefit of the approaches described herein is that the change of interpretation of controls is instigated by a detected movement of the controller; this means that it is not necessary to assign a button of the controller to this function; typically games use all the available buttons of a controller, and so it is not straightforward to assign a new function to one (particularly in the case of legacy games whose functionality is already fixed). This is then exacerbated in the case of a user that already has restricted physical access to the buttons. Meanwhile, motion control input is used less frequently or for less critical functions, and even where it is used, it will generally be possible to identify and select a trigger motion for the purposes of the present techniques that is not required or used by the current game or application, allowing the present techniques to coexist transparently with the games and applications being controlled in this manner. It will also be appreciated the such motion is typically caused by the user's wrist or arm rather than by their fingers; hence again this may be easier to actuate for a user with finger mobility issues, for example due to arthritis.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer-implemented method comprising:

receiving, from a controller, (i) control actuation information that is indicative of detected actuation of one or more controls of the controller, and (ii) motion detection information that is indicative of detected motion of the controller;

comparing the detected motion with a predetermined pattern of motion;

entering into a first operation mode to remap a detected actuation of a first control of the controller to an undetected actuation of a second control of the controller based on the detected motion matching the predetermined pattern of motion; and providing the second control to a computer simulation.

2. The computer-implemented method of claim 1, remapping the detected actuation of the first control of the controller to the undetected actuation of the second control of the controller comprises linking actuation of a first button in a first portion of the controller to actuation of a second button in a second portion of the controller, and a position of the first button in the first portion is the same as a position of the second button in the second portion.

3. The computer-implemented method of claim 1, remapping the detected actuation of the first control of the controller to the undetected actuation of the second control of the controller comprises linking actuation of a first button in a first portion of the controller to actuation of a second button in a second portion of the controller, and the first button in the first portion is at a reflected position of the second button in the second portion.

4. The computer-implemented method of claim 1, comprising:

applying a low pass filter or hysteresis to the motion detection information to obtain a filtered detected motion of the controller;

comparing the filtered detected motion of the controller with the predetermined pattern of motion; and remapping the detected actuation of the first control of the controller to the undetected actuation of the second control of the controller based on the filtered detected motion matching the predetermined pattern of motion.

5. The computer-implemented method of claim 1, the predetermined pattern of motion comprises a threshold number of degrees of rotation of the controller or a threshold distance of moving the controller.

6. The computer-implemented method of claim 1, comprising:

receiving second motion detection information that is indicative of second detected motion of the controller;

comparing the second detected motion with a locking pattern of motion; and locking a remapping relation between the detected actuation of the first control of the controller to the undetected actuation of the second control of the controller.

7. The computer-implemented method of claim 6, the locking pattern of motion comprises performing a particular pattern of motion several times within a predetermined time period.

8. The computer-implemented method of claim 1, comprising:

receiving second motion detection information that is indicative of second detected motion of the controller;

comparing the second detected motion with a second predetermined pattern of motion; and switching into a second operation mode to disable remapping between the detected actuation of the first control of the controller and the undetected actuation of the second control of the controller based on the second detected motion matching the second predetermined pattern of motion.

9. The computer-implemented method of claim 1, comprising:

receiving information that is indicative of a stationary state of the controller for a predetermined time period; and switching into a second operation mode to disable remapping between the detected actuation of the first control of the controller and the undetected actuation of the second control of the controller based on the stationary state of the controller for the predetermined time period.

10. A system comprising one or more computers and one or more storage devices storing instructions that are operable, when executed by the one or more computers to cause the one or more computers to perform operations comprising:

receiving, from a controller, (i) control actuation information that is indicative of detected actuation of one or more controls of the controller, and (ii) motion detection information that is indicative of detected motion of the controller;

comparing the detected motion with a predetermined pattern of motion;

entering into a first operation mode to remap a detected actuation of a first control of the controller to an undetected actuation of a second control of the controller based on the detected motion matching the predetermined pattern of motion; and providing the second control to a computer simulation.

11. The system of claim 10, remapping the detected actuation of the first control of the controller to the undetected actuation of the second control of the controller comprises linking actuation of a first button in a first portion of the controller to actuation of a second button in a second portion of the controller, and a position of the first button in the first portion is the same as a position of the second button in the second portion.

12. The system of claim 10, remapping the detected actuation of the first control of the controller to the undetected actuation of the second control of the controller comprises linking actuation of a first button in a first portion of the controller to actuation of a second button in a second portion of the controller, and the first button in the first portion is at a reflected position of the second button in the second portion.

13. The system of claim 10, the operations comprising:

applying a low pass filter or hysteresis to the motion detection information to obtain a filtered detected motion of the controller;

comparing the filtered detected motion of the controller with the predetermined pattern of motion; and remapping the detected actuation of the first control of the controller to the undetected actuation of the second control of the controller based on the filtered detected motion matching the predetermined pattern of motion.

14. The system of claim 10, the predetermined pattern of motion comprises a threshold number of degrees of rotation of the controller or a threshold distance of moving the controller.

15. The system of claim 10, the operations comprising:

receiving second motion detection information that is indicative of second detected motion of the controller;

comparing the second detected motion with a locking pattern of motion; and locking a remapping relation between the detected actuation of the first control of the controller to the undetected actuation of the second control of the controller.

16. The system of claim 10, the operations comprising:

receiving second motion detection information that is indicative of second detected motion of the controller;

comparing the second detected motion with a second predetermined pattern of motion; and switching into a second operation mode to disable remapping between the detected actuation of the first control of the controller and the undetected actuation of the second control of the controller based on the second detected motion matching the second predetermined pattern of motion.

17. The system of claim 10, the operations comprising:

receiving information that is indicative of a stationary state of the controller for a predetermined time period; and switching into a second operation mode to disable remapping between the detected actuation of the first control of the controller and the undetected actuation of the second control of the controller based on the stationary state of the controller for the predetermined time period.

18. One or more non-transitory computer storage media encoded with computer program instructions that when executed by one or more computers cause the one or more computers to perform operations comprising:

receiving, from a controller, (i) control actuation information that is indicative of detected actuation of one or more controls of the controller, and (ii) motion detection information that is indicative of detected motion of the controller;

comparing the detected motion with a predetermined pattern of motion;

entering into a first operation mode to remap a detected actuation of a first control of the controller to an undetected actuation of a second control of the controller based on the detected motion matching the predetermined pattern of motion; and providing the second control to a computer simulation.

19. The one or more non-transitory computer storage media of claim 18, remapping the detected actuation of the first control of the controller to the undetected actuation of the second control of the controller comprises linking actuation of a first button in a first portion of the controller to actuation of a second button in a second portion of the controller, and a position of the first button in the first portion is the same as a position of the second button in the second portion.

20. The one or more non-transitory computer storage media of claim 18, remapping the detected actuation of the first control of the controller to the undetected actuation of the second control of the controller comprises linking actuation of a first button in a first portion of the controller to actuation of a second button in a second portion of the controller, and the first button in the first portion is at a reflected position of the second button in the second portion.

* * * * *